US012296636B2

(12) United States Patent
Dwinal et al.

(10) Patent No.: US 12,296,636 B2
(45) Date of Patent: May 13, 2025

(54) AGRICULTURAL VEHICLE WITH ROLL RESISTANT SUSPENSION SYSTEM

(71) Applicant: CNH Industrial America LLC, New Holland, PA (US)

(72) Inventors: Andrew Dwinal, New Holland, PA (US); Jerry Brinkley, Woodridge, IL (US); Richard Kerner, West Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 210 days.

(21) Appl. No.: 18/139,802

(22) Filed: Apr. 26, 2023

(65) Prior Publication Data

US 2024/0359519 A1 Oct. 31, 2024

(51) Int. Cl.
*B60G 17/016* (2006.01)
*A01B 76/00* (2006.01)
*B60G 17/056* (2006.01)
*B60G 17/08* (2006.01)

(52) U.S. Cl.
CPC .......... *B60G 17/0162* (2013.01); *A01B 76/00* (2013.01); *B60G 17/056* (2013.01); *B60G 17/08* (2013.01); *B60G 2400/204* (2013.01); *B60G 2400/252* (2013.01); *B60G 2400/412* (2013.01)

(58) Field of Classification Search
CPC .... B60G 17/0162; B60G 17/056; A01B 76/00
See application file for complete search history.

(56) References Cited

U.S. PATENT DOCUMENTS

| 7,350,793 | B2 | 4/2008 | Munday |
| 7,360,771 | B2 | 4/2008 | Smay et al. |
| 7,497,452 | B2 | 3/2009 | Schedgick |

(Continued)

OTHER PUBLICATIONS

Gong et al., "Variable damping control strategy of a semi-active suspension based on the actuator motion state," Jounral of Low Frequency Noise, Vibration, and Active Control 202, vol. 39(3) 787-802; Retrieved from: https://journals.sagepub.com/doi/10.1177/1461348418825416.

(Continued)

*Primary Examiner* — Long T Tran
(74) *Attorney, Agent, or Firm* — Rickard K. DeMille; Rebecca L. Henkel; Peter K. Zacharias

(57) ABSTRACT

An agricultural vehicle includes a frame, a body assembly coupled with the frame, a suspension system and a control system. The suspension system includes a pair of dampers positioned at opposite lateral ends of an axle. The suspension system includes a hydraulic system having a hydraulic line fluidly coupling the pair of dampers with each other through a valve. The valve is actuatable between an open position wherein the pair of dampers are fluidly coupled with each other, and a closed position in which the pair of dampers are hydraulically isolated from each other. The control system circuitry configured to obtain sensor feedback indicating a steering operation of the agricultural vehicle, and responsive to the steering operation of the agricultural vehicle, operate the valve into the closed position to hydraulically isolate the pair of dampers from each other to reduce a roll of the body assembly of the agricultural vehicle.

20 Claims, 8 Drawing Sheets

(56) References Cited

U.S. PATENT DOCUMENTS

| | | | |
|---|---|---|---|
| 8,342,280 B2 | 1/2013 | Turco et al. | |
| 10,828,955 B1* | 11/2020 | Edren | B60G 17/0528 |
| 10,961,667 B2 | 3/2021 | Wiktor | |
| 11,358,430 B2 | 6/2022 | Tebbe et al. | |
| 11,390,129 B1* | 7/2022 | Edren | B60G 17/0155 |
| 11,529,836 B1* | 12/2022 | Schubart | B60G 21/073 |
| 2001/0024021 A1* | 9/2001 | Allen | E02F 9/2217 |
| | | | 280/124.1 |
| 2010/0044124 A1 | 2/2010 | Radke et al. | |
| 2011/0187065 A1* | 8/2011 | Van Der Knaap | B60G 17/016 |
| | | | 280/5.507 |
| 2014/0232082 A1 | 8/2014 | Oshita et al. | |
| 2015/0217619 A1 | 8/2015 | Benevelli et al. | |
| 2018/0345750 A1 | 12/2018 | Chikamatsu et al. | |
| 2019/0359025 A1* | 11/2019 | Wager | B60G 21/005 |
| 2021/0276643 A1* | 9/2021 | Ellifson | B60B 35/007 |
| 2021/0387495 A1* | 12/2021 | Tebbe | B60G 17/0152 |
| 2022/0032719 A1* | 2/2022 | Benevelli | B60G 13/08 |
| 2023/0111977 A1* | 4/2023 | Boon | B60G 17/01908 |
| | | | 701/37 |

OTHER PUBLICATIONS

Vu et al.; "Active anti-roll bar control using electronic servo valve hydraulic damper on single unit heavy vehicle"; HAL Open Science; May 11, 2016; Retrieved from: https://hal.archives-ouvertes.fr/hal-01314529/document.

* cited by examiner

AGRICULTURAL VEHICLE WITH ROLL RESISTANT SUSPENSION SYSTEM

BACKGROUND

The present disclosure relates generally to an agricultural vehicle. More specifically, the present disclosure relates to a control system for an agricultural vehicle.

SUMMARY

One embodiment relates to an agricultural vehicle. The agricultural vehicle includes a frame, a body assembly coupled with the frame, a suspension system and a control system. The suspension system includes a pair of integrated spring dampers positioned at opposite lateral ends of an axle. The pair of integrated spring dampers coupled between the body assembly and the axle. The suspension system includes a hydraulic system having a hydraulic line fluidly coupling the pair of integrated spring dampers with each other through a valve. The valve is actuatable between an open position in which the pair of integrated spring dampers are fluidly coupled with each other, and a closed position in which the pair of integrated spring dampers are hydraulically isolated from each other. The control system includes processing circuitry configured to obtain sensor feedback indicating a steering operation of the agricultural vehicle, and responsive to the steering operation of the agricultural vehicle, operate the valve into the closed position to hydraulically isolate the pair of integrated spring dampers from each other to reduce a roll of the body assembly of the agricultural vehicle.

In some embodiments, the valve is a pneumatically or electrically operable valve that is transitionable between the open position and the closed position. In some embodiments, when the valve is in the open position, the pair of integrated spring dampers are fluidly coupled with each other such that fluid can flow out of a chamber of a first of the pair of integrated spring dampers when compressed, travel through the hydraulic line, and enter an accumulator or a chamber of a second of the pair of integrated spring dampers. In some embodiments, when the valve is in the closed position, the pair of integrated spring dampers are fluidly de-coupled from each other and hydraulically isolated such that fluid is limited from flowing out of the chamber of the first of the pair of integrated spring dampers to the chamber or the accumulator of the second of the pair of integrated spring dampers.

In some embodiments, the pair of integrated spring dampers each include a single hydraulic chamber and are hydraulically single-acting suspension components. In some embodiments, the processing circuitry is configured to obtain sensor feedback indicating a degree of rotation or a rate of rotation of a steering wheel and a speed of the agricultural vehicle. In some embodiments, the processing circuitry is configured to predict, based on the degree of rotation or the rate of rotation of the steering wheel, the speed of the agricultural vehicle, and one or more characteristics of the agricultural vehicle, a predicted amount of roll of the body assembly. In some embodiments, the processing circuitry is configured to, responsive to the predicted amount of roll of the body assembly exceeding a threshold roll amount, operate the valve to transition into the closed position to limit roll of the body assembly when performing the steering operation.

In some embodiments, the one or more characteristics of the agricultural vehicle include a weight of the agricultural vehicle, a height of a center of gravity of the agricultural vehicle relative to a ground surface, and a type of implement installed on the agricultural vehicle. In some embodiments, the processing circuitry is further configured to obtain ride height data from one or more ride height sensors while the agricultural vehicle performs a turn, the ride height data indicating a corner height of one of the pair of integrated spring dampers while performing the turn. In some embodiments, the processing circuitry is configured to control the valve to transition between the open position and the closed position according to a pulse width modulated signal, a duty cycle of the pulse width modulated signal determined based on the corner height of at least one of the pair of integrated spring dampers. In some embodiments, the processing circuitry is configured to, responsive to the steering operation, and a speed of the agricultural vehicle exceeding a threshold, operate the valve into the closed position.

Another embodiment relates to a control system for an agricultural vehicle. The control system includes processing circuitry configured to obtain sensor feedback indicating a steering operation of the agricultural vehicle. The processing circuitry is also configured to, responsive to the steering operation of the agricultural vehicle, operate a valve of a suspension system into a closed position to hydraulically isolate a pair of integrated spring dampers from each other to reduce a roll of a body assembly of the agricultural vehicle. The pair of integrated spring dampers are positioned at opposite lateral ends of an axle, the pair of integrated spring dampers coupled between the body assembly and the axle. The valve is positioned along a hydraulic line of a hydraulic system of the suspension system, the hydraulic line fluidly coupling the pair of integrated spring dampers with each other through the valve. The valve is actuatable between an open position in which the pair of integrated spring dampers are fluidly coupled with each other, and the closed position in which the pair of integrated spring dampers are hydraulically isolated from each other.

In some embodiments, the valve is a pneumatically or electrically operable valve that is transitionable between the open position and the closed position. When the valve is in the open position, the pair of integrated spring dampers are fluidly coupled with each other such that fluid can flow out of a chamber of a first of the pair of integrated spring dampers when compressed, travel through the hydraulic line, and enter an accumulator or a chamber of a second of the pair of integrated spring dampers. When the valve is in the closed position, the pair of integrated spring dampers are fluidly de-coupled from each other and hydraulically isolated such that fluid is limited from flowing out of the chamber of the first of the pair of integrated spring dampers to the chamber or the accumulator of the second of the pair of integrated spring dampers.

In some embodiments, the pair of integrated spring dampers each include a single hydraulic chamber and are hydraulically single-acting suspension components. In some embodiments, the processing circuitry is configured to obtain sensor feedback indicating a degree of rotation or a rate of rotation of a steering wheel and a speed of the agricultural vehicle. In some embodiments, the processing circuitry is configured to predict, based on the degree of rotation or the rate of rotation of the steering wheel, the speed of the agricultural vehicle, and one or more characteristics of the agricultural vehicle, a predicted amount of roll of the body assembly. In some embodiments, the processing circuitry is configured to, responsive to the predicted amount of roll of the body assembly exceeding a threshold roll amount, operate the valve to transition into the closed position to limit roll of the body assembly when performing the steering operation.

The one or more characteristics of the agricultural vehicle may include a weight of the agricultural vehicle, a height of a center of gravity of the agricultural vehicle relative to a ground surface, and a type of implement installed on the agricultural vehicle. The processing circuitry is further configured to obtain ride height data from one or more ride height sensors while the agricultural vehicle performs a turn, the ride height data indicating a corner height of one of the pair of integrated spring dampers while performing the turn. The processing circuitry is also configured to control the valve to transition between the open position and the closed position according to a pulse width modulated signal, a duty cycle of the pulse width modulated signal determined based on the corner height of at least one of the pair of integrated spring dampers. In some embodiments, the processing circuitry is configured to, responsive to the steering operation, and a speed of the agricultural vehicle exceeding a threshold, operate the valve into the closed position.

Still another embodiment relates to a method for operating a suspension system of an agricultural vehicle. The method includes obtaining sensor feedback indicating a steering operation of the agricultural vehicle. The method also includes, responsive to the steering operation of the agricultural vehicle, operating a valve of the suspension system into a closed position to hydraulically isolate a pair of integrated spring dampers from each other to reduce a roll of a body assembly of the agricultural vehicle. The pair of integrated spring dampers are positioned at opposite lateral ends of an axle and are coupled between the body assembly and the axle. The valve is positioned along a hydraulic line of a hydraulic system of the suspension system, the hydraulic line fluidly coupling the pair of integrated spring dampers with each other through the valve. The valve is actuatable between an open position in which the pair of integrated spring dampers are fluidly coupled with each other, and the closed position in which the pair of integrated spring dampers are hydraulically isolated from each other.

When the valve is in the open position, the pair of integrated spring dampers are fluidly coupled with each other such that fluid can flow out of a chamber of a first of the pair of integrated spring dampers when compressed, travel through the hydraulic line, and enter an accumulator or a chamber of a second of the pair of integrated spring dampers. When the valve is in the closed position, the pair of integrated spring dampers are fluidly de-coupled from each other and hydraulically isolated such that fluid is limited from flowing out of the chamber of the first of the pair of integrated spring dampers to the chamber or the accumulator of the second of the pair of integrated spring dampers.

The method can also include obtaining sensor feedback indicating a degree of rotation or a rate of rotation of a steering wheel and a speed of the agricultural vehicle. The method also includes predicting, based on the degree of rotation or the rate of rotation of the steering wheel, the speed of the agricultural vehicle, and one or more characteristics of the agricultural vehicle, a predicted amount of roll of the body assembly. The method also includes, responsive to the predicted amount of roll of the body assembly exceeding a threshold roll amount, operating the valve to transition into the closed position to limit roll of the body assembly when performing the steering operation. In some embodiments, the one or more characteristics of the agricultural vehicle include a weight of the agricultural vehicle, a height of a center of gravity of the agricultural vehicle relative to a ground surface, and a type of implement installed on the agricultural vehicle.

The method may also include obtaining ride height data from one or more ride height sensors while the agricultural vehicle performs a turn. The ride height data may indicate a corner height of one of the pair of integrated spring dampers while performing the turn. The method also includes controlling the valve to transition between the open position and the closed position according to a pulse width modulated signal, a duty cycle of the pulse width modulated signal determined based on the corner height of at least one of the pair of integrated spring dampers This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a suspension system for an agricultural vehicle includes a pair of integrated spring dampers that absorb shocks or impacts that are transferred to tractive elements of the agricultural vehicle when transporting (e.g., in a field operation). A hydraulic system includes a hydraulic line that fluidly couples chambers of the integrated spring dampers through a valve that is actuatable between an open position and a closed position. A control system includes a controller configured to monitor speed and steering operations of the agricultural vehicle, and, based on the speed and steering operations, transition the valve between the open position and the closed position.

The controller transitions the valve into the closed position to isolate the left and right integrated spring dampers when the agricultural vehicle is steering around a turn in order to mitigate body roll of the agricultural vehicle and improve stability and comfort for the driver.

Overall Vehicle

Figure 1:
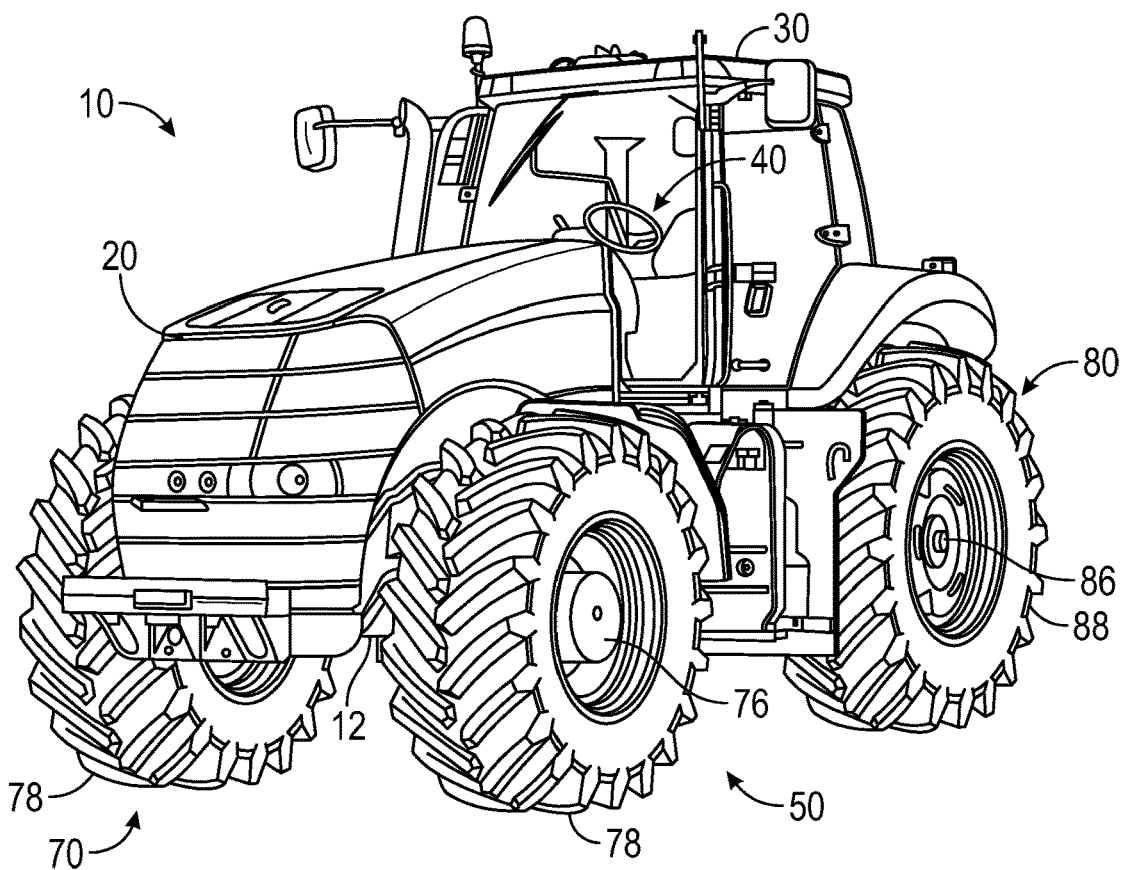
FIG. 1 is a perspective view of a vehicle, according to an exemplary embodiment.
Figure 2:
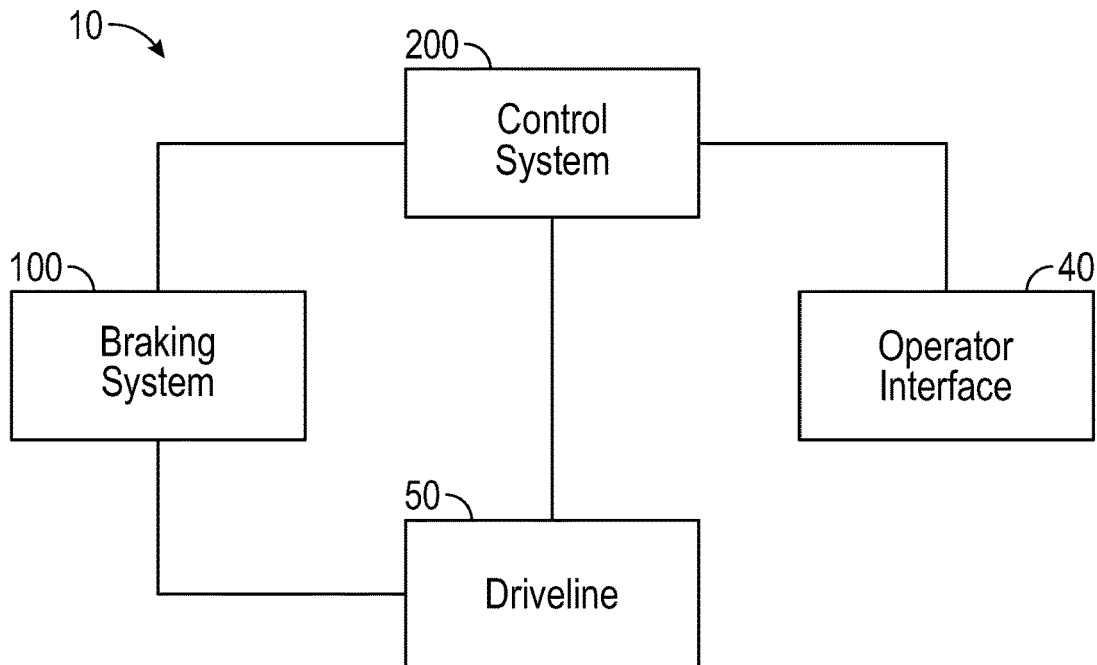
FIG. 2 is a schematic block diagram of the vehicle of FIG. 1, according to an exemplary embodiment.
Figure 3:
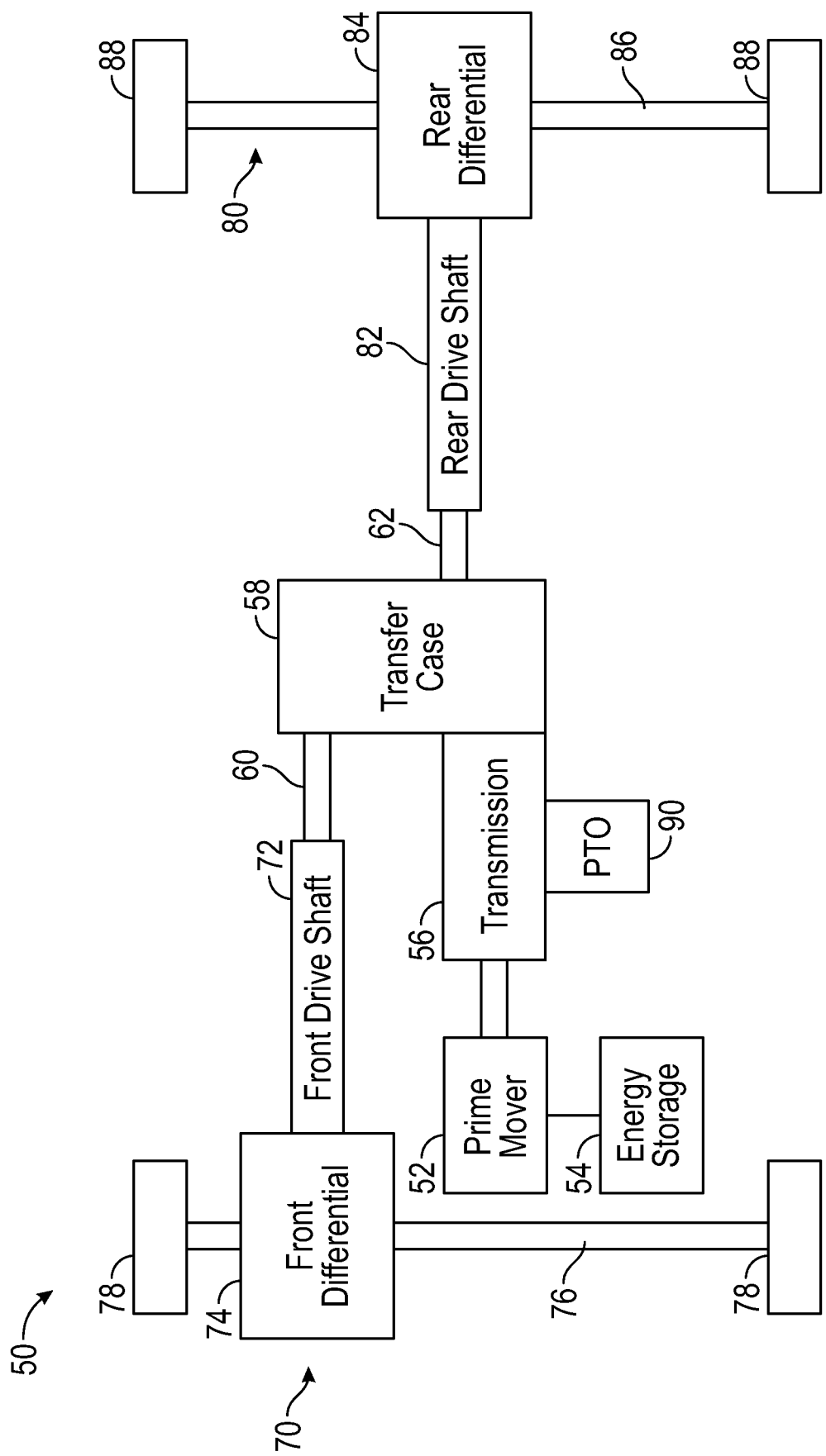
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 200, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Roll Resistant Suspension

Referring to FIGS. 4-10, the vehicle 10 can include a suspension system 300 and a corresponding control system 900 for operating the suspension system 300, according to an exemplary embodiment. The suspension system 300 is configured to provide adjustable roll stiffness for the vehicle 10 so that when a turn is performed while driving the vehicle 10, the body assembly 20 does not roll an undesirable amount. In some embodiments, the suspension system 300 is transitionable between a stiffened mode or state and a roll mode or state. In some embodiments, the control system 900 is configured to detect, based on a speed and a requested turn (e.g., via a steering wheel of the vehicle 10), whether to transition between the roll mode and the stiffened mode. The control system 900 may identify or predict, based on known characteristics of the vehicle 10 (e.g., weight, height, center of gravity, installed implements, current cargo loads, etc.), the requested turn of the vehicle 10, and the speed of the vehicle 10, an amount of roll or a moment of the body assembly 20, and, if the predicted amount or roll or the moment of the body assembly 20 exceeds a threshold amount, transition the suspension system 300 from the roll mode to the stiffened mode. In some embodiments, the control system 900 is configured to monitor sensor feedback and requested turns in real-time and preemptively transition the suspension system 300 into the stiffened mode before the body assembly 20 begins to roll. Advantageously, the suspension system 300 and the control system 900 facilitate improved comfort for an operator of the vehicle 10 and reduced roll of the body assembly 20 relative to the frame 12.

Figure 6:
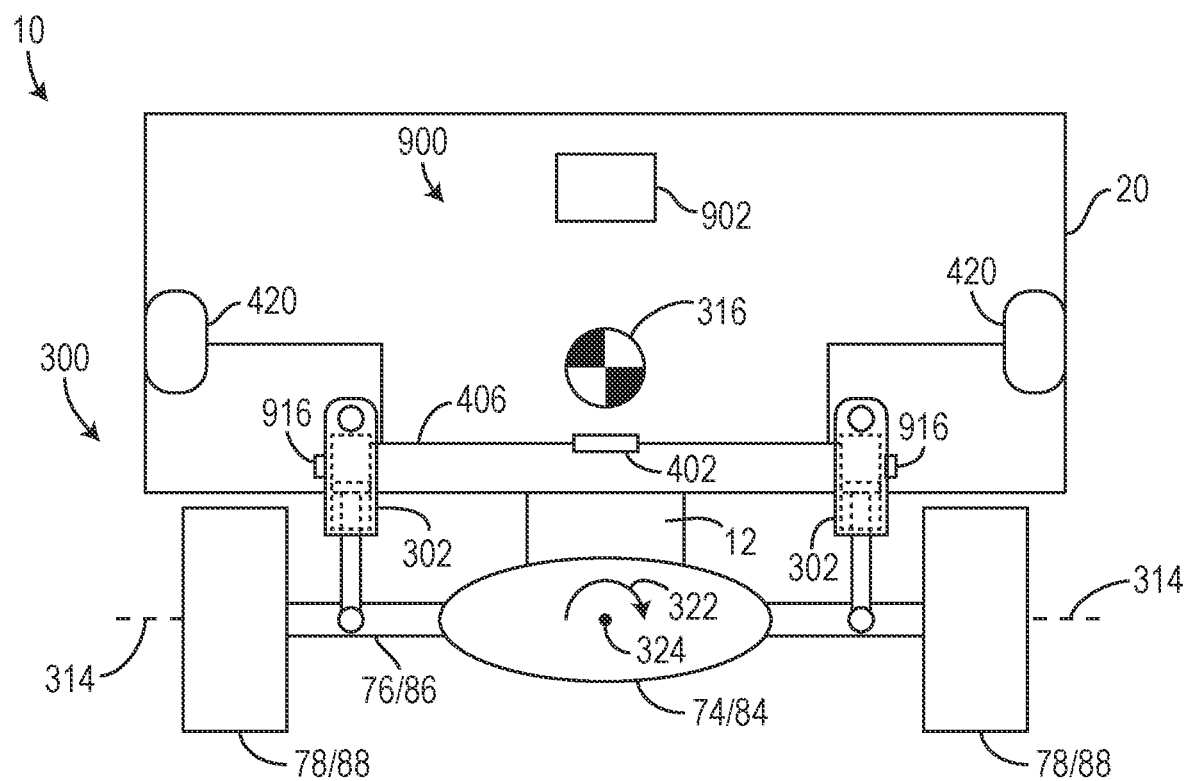
FIG. 6 is a diagram of a suspension system of the agricultural vehicle of FIG. 1, according to an exemplary embodiment.
Figure 7:
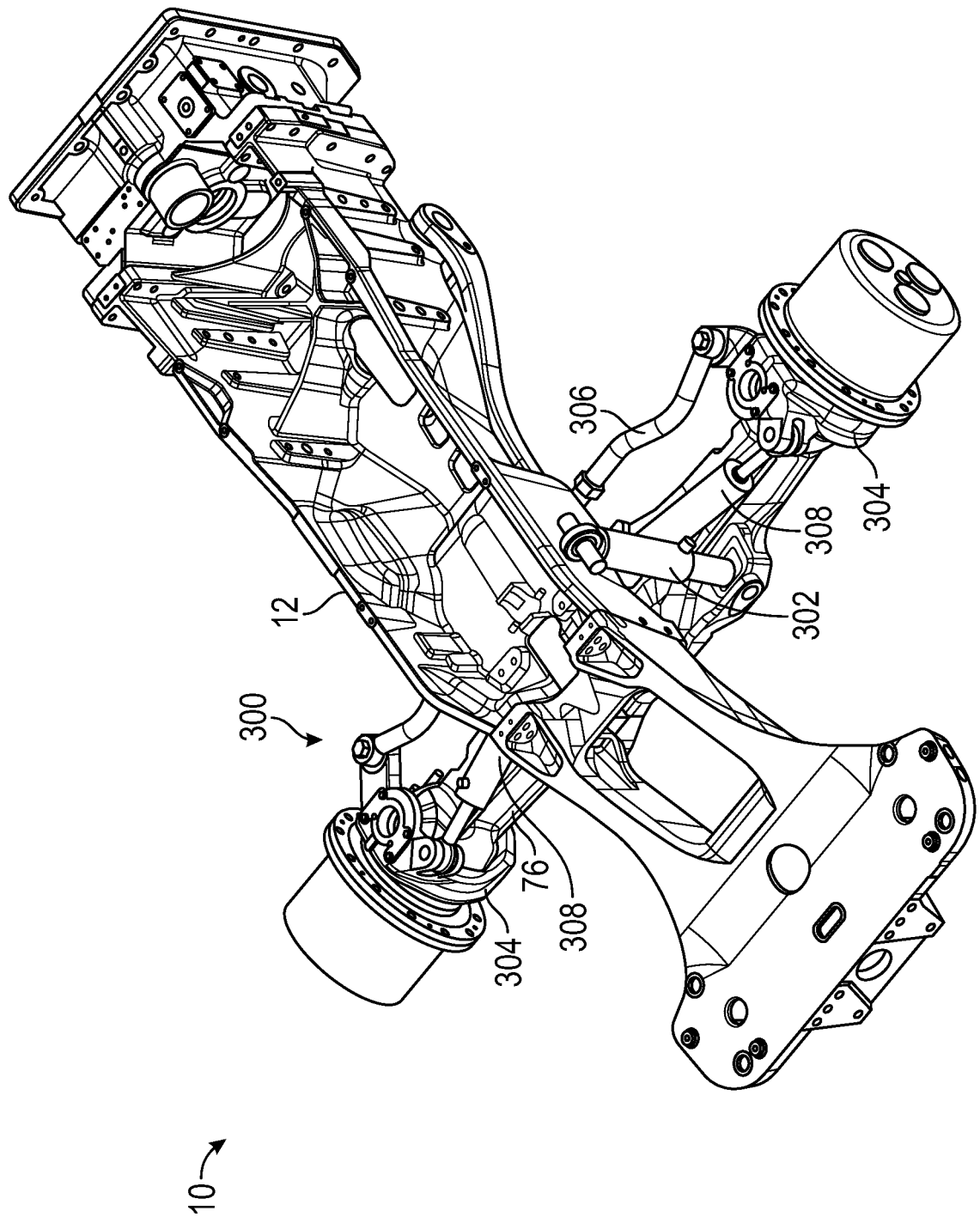
FIG. 7 is a perspective view of the suspension system of FIG. 6, according to an exemplary embodiment.

Referring particularly to FIGS. 6 and 7, the vehicle 10 includes the suspension system 300, according to some embodiments. The suspension system 300 includes a pair of dampers 302 (e.g., hydraulic acting suspension components including springs, integrated spring dampers, single action hydraulic cylinders, etc.) that are coupled at a first end with the frame 12 and opposite ends with the front axle 76 or the rear axle 86. In some embodiments, a front and rear of the vehicle 10 includes a pair of the dampers 302. The body assembly 20 may rotate or lean relative to the frame 12 or the axles 76 and 86 (e.g., about a longitudinal axis 324 or a pivotal coupling between the body assembly 20 and the axle 76 or 86) when undergoing a turn due to momentum of the body assembly 20. The pair of dampers 302 include chambers (e.g., on a cap side or a rod side) that are fluidly coupled with each other through hydraulic lines 406. For example, when one of the tractive elements 78 or 88 hits a bump in a field operation, the corresponding damper 302 may retract, thereby causing the chamber to decrease in volume and expel hydraulic fluid out of the chamber (e.g., through the hydraulic line 406 to the chamber of the other damper 302, or into a corresponding accumulator 420). In some embodiments, the accumulators are integrated into the dampers 302. In some embodiments, the hydraulic line 406 that fluidly couples the chambers of the dampers 302 on either side of the axles 76 or 86 includes a valve 402 (e.g., a pneumatically operated valve, an electrically operated valve, etc.) that is transitionable between an open position to allow the exchange of hydraulic fluid between the dampers 302, and a closed position to isolate the chambers of the dampers 302. In some embodiments, transitioning the valve 402 into the open position results in the suspension system 300 being transitioned into the roll mode (e.g., for a field operation or for when traveling in a substantially straight line such that the predicted roll does not exceed a threshold), and transitioning the valve 402 into the closed position (e.g., to fluidly isolate the chambers of the dampers 302) results in the suspension system 300 being transitioned into the stiffened mode (e.g., during transportation of the vehicle 10, when performing a 180 degree turn at an end of a row during a harvesting or plowing operations, when the predicted roll of the body assembly 20 exceeds a threshold amount, etc.).

Referring particularly to FIG. 7, the suspension system 300 may include, at a front or steerable end of the vehicle 10, a tie rod 306 that extends between wheel hub assemblies 304. The wheel hub assemblies 304 can be positioned at opposite lateral ends of the front axle 76 and are pivotally coupled with the front axle 76. The wheel hub assemblies 304 may be driven to rotate by steering cylinders 308 (e.g., actuators, linear electric actuators, hydraulic actuators, etc.) which extend or retract responsive to rotation of a steering wheel of the vehicle 10. In some embodiments, the wheel hub assemblies 304 provide structure configured to receive and fixedly couple with the front tractive elements 78. In some embodiments, the front tractive elements 78 are configured to be driven to rotate (e.g., about axes 314 shown in FIGS. 4-6) to transport the vehicle 10 by one or more axles (e.g., constant velocity axles, etc.) that couple with the tractive elements 78 at the wheel hub assemblies 304. In some embodiments, the front tractive elements 78 are follower tractive elements (e.g., the vehicle 10 is a rear wheel drive vehicle). In some embodiments, the vehicle 10 is a four wheel drive vehicle and the tractive elements 78 are powered.

Figure 4:
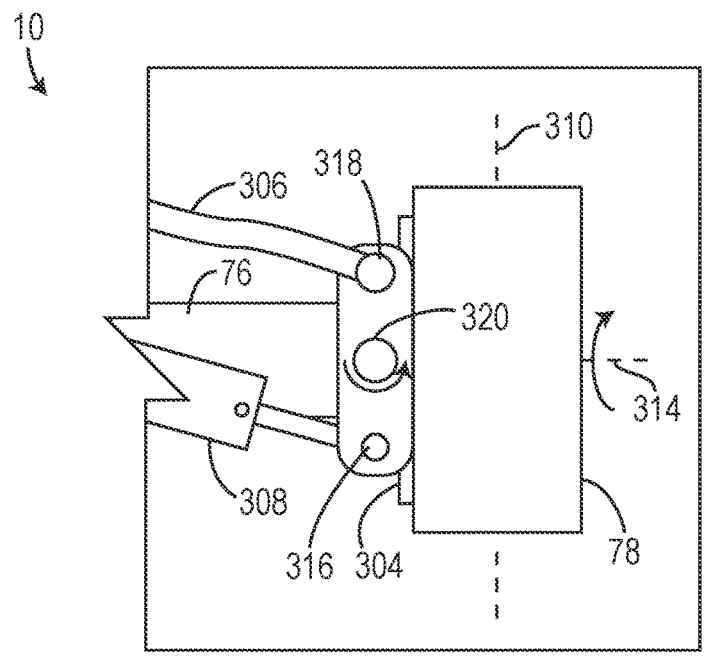
FIGS. 4-5 are diagrams illustrating a steering system of the agricultural vehicle of FIG. 1, according to an exemplary embodiment.
Figure 5:
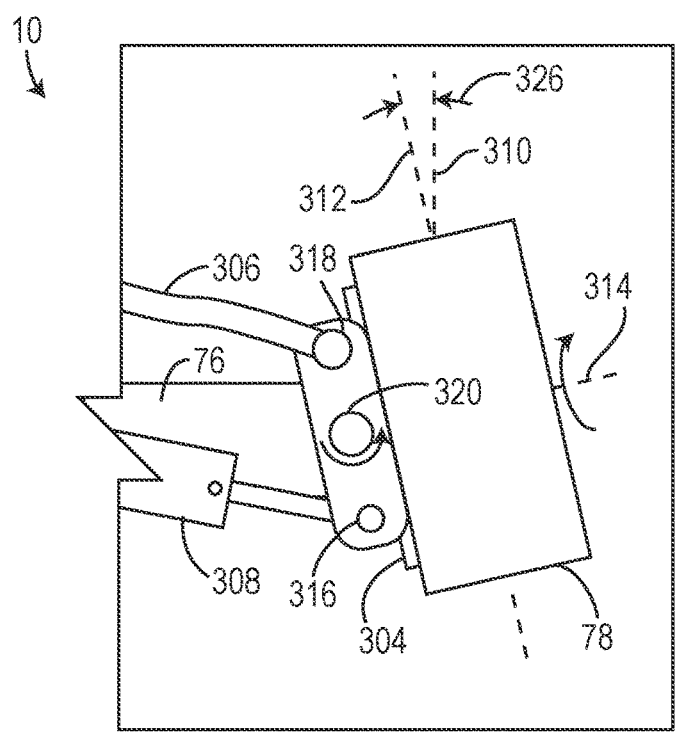

Referring to FIGS. 4-5, the steering cylinders 308 and the tie rods 306 are pivotally coupled with the wheel hub assembly 304 at pivots 316 318 (e.g., pivotal couplings), respectively. The steering cylinders 308 may operate to extend or retract (e.g., responsive to an input by the driver at a steering wheel) to rotate the wheel hub assembly 304 and the front tractive element 78 (in unison with rotation of the front tractive element 78 on the opposite lateral side of the vehicle 10 which is symmetrical to the side shown in FIGS. 4-5) about a pivot 320 relative to the front axle 76 to initiate a turn of the vehicle 10. In some embodiments, the tractive elements 78 can be rotated from a neutral position (shown in FIG. 4) where the vehicle 10 travels in a straight line to a rotated position (shown in FIG. 5). The tractive elements 78 may be rotated an angular amount 326 which indicates a direction or relative rotation of the tractive elements 78 relative to a neutral axis 310 (e.g., the angular amount 326 being a measure between a rotated axis 312 of the front tractive elements 78 relative to the neutral axis 310).

Referring to FIGS. 4-6, when the front tractive elements 78 are steered or turned about the pivots 320, the vehicle 10 may initiate a steering or turning operation, which may cause the body assembly 20 of the vehicle 10 to roll or rotate relative to the longitudinal axis 324 by producing a moment 322 about the longitudinal axis 324 (e.g., the point at which the body assembly 20 pivotally couples with a lower portion of the frame 12). When the roll of the body is predicted to exceed a threshold, the valve 402 may be transitioned into the closed position to isolate the left and right dampers 302. In some embodiments, both the front end of the vehicle 10 and the rear end of the vehicle 10 include dampers 302 that are coupled between the body assembly 20 and the front axle 76 or the rear axle 86, and are selectably isolated by a corresponding valve 402. In some embodiments, the suspension system 300 includes two valves 402 (e.g., a front valve 402 between a front pair of dampers 302 and a rear valve 402 between a rear pair of dampers 302).

Figure 8:
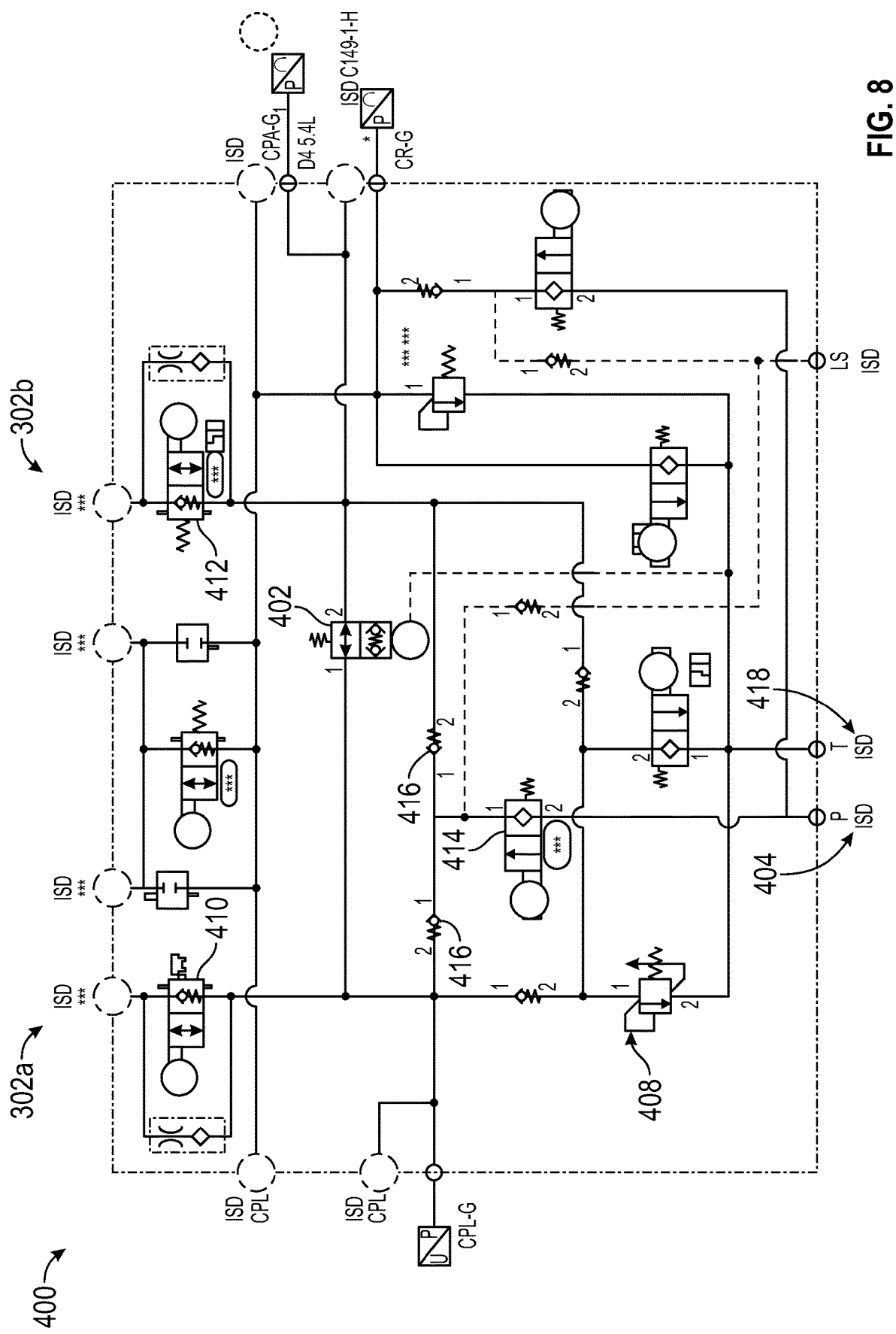
FIG. 8 is a block diagram of a hydraulic system of the suspension system of FIGS. 6-7, according to an exemplary embodiment.

Referring to FIG. 8, a diagram of a hydraulic system 400 the hydraulic components of the suspension system 300 and operation thereof, according to some embodiments. In some embodiments, the hydraulic system 400 is provided by a pump 404 with hydraulic fluid (e.g., to fill the hydraulic system 400 with fluid) which is provided through hydraulic lines and through an actuatable valve 414. Once the hydraulic system 400 is filled with fluid, the actuatable valve 414 may be transitioned into a closed position. The hydraulic fluid that is passed through the actuatable valve 414 may be provided to each of the pair of dampers 302 through one-way valves 416 via branches. In some embodiments, each of the dampers 302 includes a corresponding actuatable valve 410 or actuatable valve 412 that is transitionable between a one-way valve position and an open position (e.g., damper 302a includes actuatable valve 410 positioned at an inlet of the chamber of damper 302a, and damper 302b includes actuatable valve 412 that is positioned at an inlet of the chamber of damper 302b).

In some embodiments, hydraulic fluid can be driven out of the dampers 302 between the chambers of the dampers 302 or to the accumulator of the other damper 302 and vice versa, through the valve 402. In some embodiments, the valve 402 may be transitioned between the open and closed position in order to isolate the damper 302a and the damper 302b from each other. When the valve 402 is transitioned into the closed position, the damper 302a may provide fluid out of the chamber into the corresponding accumulator, but not into the chamber of the damper 302b or into the accumulator of the damper 302b, or vice versa. Referring still to FIG. 8, the hydraulic system 400 may include a pressure relief valve 408 on a return line of the damper 302a and the damper 302b. The pressure relief valve 408 may allow back flow of hydraulic fluid into a tank 418 when a pressure threshold is met.

Figure 9:
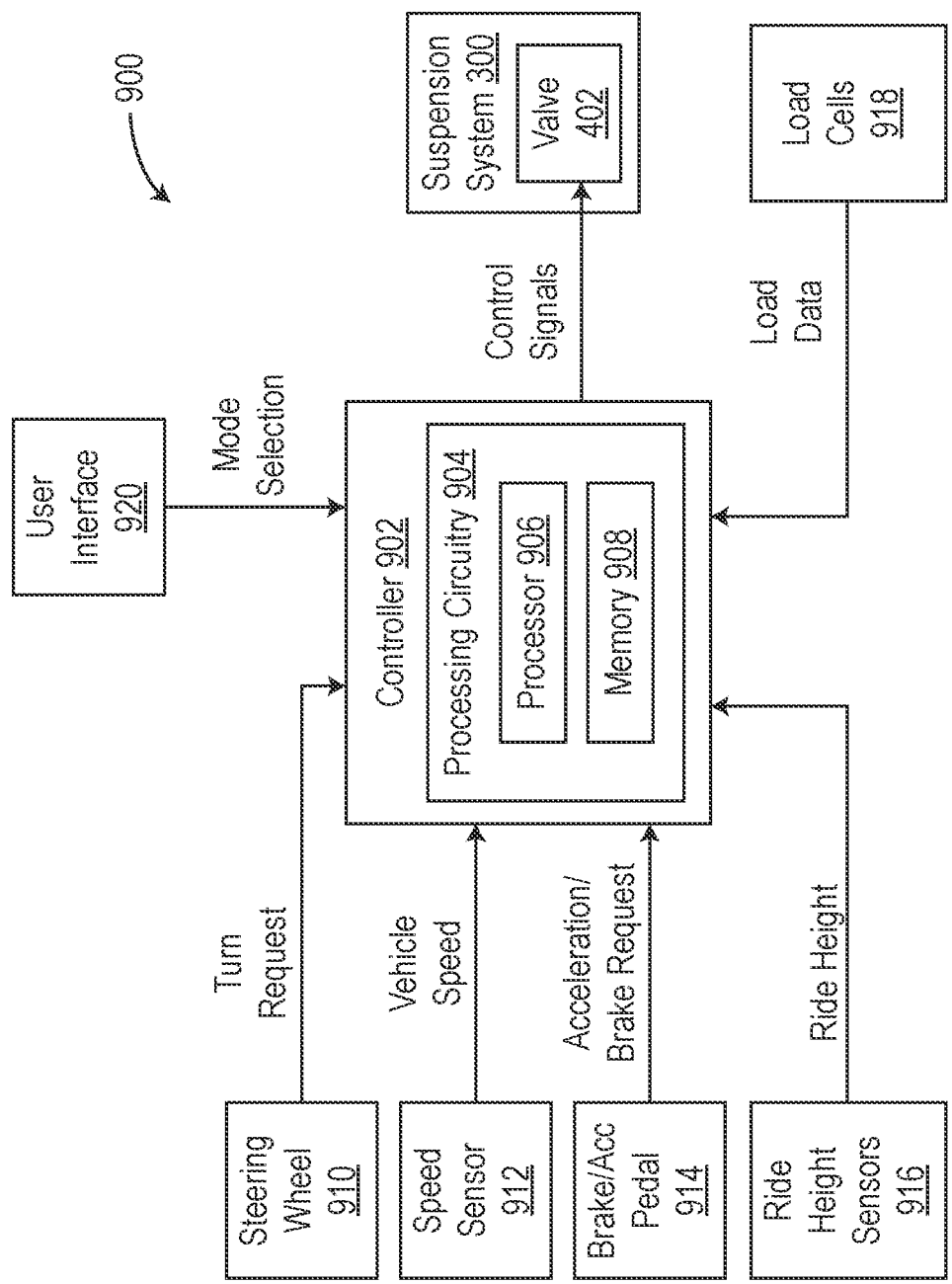
FIG. 9 is a block diagram of a control system for operating the suspension system of FIGS. 6-7, according to an exemplary embodiment.

Referring to FIG. 9, the control system 900 for the suspension system 300 includes a controller 902, a user interface 920, a steering wheel 910, a speed sensor 912, a brake and acceleration pedal 914, one or more ride height sensors 916, and the suspension system 300. In some embodiments, the controller 902 is configured to receive a turn request from the steering wheel 910 (e.g., an indication of a degree or rate of turn of the steering wheel 910) and a vehicle speed from the speed sensor 912. The controller 902 may also use and store information about the vehicle 10 such as weight, a center of gravity (e.g., height of the center of gravity of the vehicle 10 relative to a ground surface), size, dimensions of the body assembly 20, wheel base, etc. The controller 902 is configured to use the vehicle speed and the turn request in combination with the information about the vehicle 10 to predict an amount of roll of the body assembly 20. In some embodiments, the controller 902 is configured to compare the predicted amount of roll of the body assembly 20 to a threshold roll amount and, responsive to the predicted amount of roll exceeding or being equal to the threshold roll amount, generating and providing control signals to the valve 402 to transition the valve into the closed position. In some embodiments, the controller 902 is configured to select a threshold for the vehicle 10 based on the information of the vehicle 10. For example, certain models of the vehicle 10 may be able to withstand higher amounts of roll than other models of vehicles and therefore may have a higher threshold. The ride height sensors 916 may be displacement sensors that monitor a displacement or degree of extension or retraction of rods of the integrated spring dampers 302 relative to a body of the dampers 302.

The controller 902 includes a circuit, shown as processing circuitry 904, a processor, shown as processor 906, and memory, shown as memory 908, according to an exemplary embodiment. Controller 902 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 9, controller 902 includes the processing circuitry 904 and memory 908. Processing circuitry 904 may include an ASIC, one or more FPGAs, a DSP, circuits containing one or more processing components, circuitry for supporting a microprocessor, a group of processing components, or other suitable electronic processing components (e.g., processor 906). In some embodiments, processing circuitry 904 is configured to execute computer code stored in memory 908 to facilitate the activities described herein. Memory 908 may be any volatile or non-volatile computer-readable storage medium capable of storing data or computer code relating to the activities described herein. According to an exemplary embodiment, memory 908 includes computer code modules (e.g., executable code, object code, source code, script code, machine code, etc.) configured for execution by processing circuitry 904. In some embodiments, controller 902 may represent a collection of processing devices (e.g., servers, data centers, etc.). In such cases, processing circuitry 904 represents the collective processors of the devices, and memory 908 represents the collective storage devices of the devices.

In some embodiments, the controller 902 is configured to use a rate of change of the steering wheel 910 (e.g., an angular speed or angular acceleration of the steering wheel 910) in order to predict the roll of the vehicle 10. In some embodiments, the controller 902 is configured to use the mode selection provided by the user interface 920 to determine the mode for the valve 402. For example, the mode selection may be a request to operate in a field mode or in a transport mode. When the vehicle 10 is operated in the transport mode, the controller 902 may transition the valve 402 into the closed position since higher speeds are expected in order to mitigate roll of the vehicle 10. Similarly, when the mode selection indicates that the vehicle 10 is operated in the field mode, the controller 902 may default to keeping the valve 402 in the open position in order to allow the dampers 302 to exchange hydraulic fluid to thereby absorb shocks from traveling over bumps, rocks, uneven terrain, etc.

In some embodiments, the controller 902 is also configured to use the ride height provided by the ride height sensors 916 to determine or predict the amount of roll of the vehicle 10. In some embodiments, the feedback from the ride height sensors 916 can be used to identify or determine a height of the center of gravity of the vehicle 10 relative to a ground surface to thereby determine the amount or roll predicted to occur due to steering or turning operations.

Referring still to FIG. 9, the controller 902 may also obtain data from the user interface 920 (or from cameras, connected equipment, etc.) regarding an implement that is currently installed on the vehicle 10. The controller 902 may also receive load data from the load cells 918 indicating a weight of the vehicle 10 (e.g., including cargo, implements, harvested materials, etc.). In some embodiments, the controller 902 is configured to determine or predict the amount or roll of the vehicle 10 based on the load data and/or information of the implement that is currently installed on the vehicle 10 (e.g., weight of the implement, how the implement changes the center of gravity of the vehicle 10, etc.).

In some embodiments, the controller 902 is configured to provide control signals to the valve 402 to transition the valve 402 between the open position and the closed position to thereby change the mode of the suspension system 300. In some embodiments, based on feedback from the ride height sensors 916, the controller 902 is configured to determine a pulse width modulated (PWM) signal for the valve 402 to transition the valve 402 between the open position and the closed position. In some embodiments, a duty cycle of the PWM signal for the valve 402 is based on a pressure feedback obtained from the dampers 302 in order to relieve pressure at one of the dampers 302. In some embodiments, the controller 902 is configured to monitor the ride height (e.g., the displacement of rods of the dampers 302) to monitor a corner height and adjust or determine the duty cycle of the PWM signal for the valve 402 based on the corner height. In some embodiments, the controller 902 is configured to use a steering wheel angle or a rate of turn of the steering wheel 910 to determine or adjust the duty cycle of the PWM signal for the valve 402. In some embodiments, the controller 902 uses the turn request or feedback from the steering wheel 910 to determine a turning radius of the vehicle 10, and uses the turning radius to predict the amount of roll of the vehicle 10. Advantageously, the control system 900 may preemptively identify and mitigate roll of the vehicle 10 to improve comfort for a driver of the vehicle 10.

Referring still to FIG. 9, the controller 902 may also receive acceleration or brake requests from the brake and accelerator pedals 914. In some embodiments, the front and rear dampers 302 of the suspension system 300 are similarly fluidly coupled with each other through another valve 402, and the controller 902 is configured to use any of the techniques described herein to predict pitch or roll of the vehicle 10 instead of roll of the body assembly 10. The controller 902 may similarly transition the valve between the front and rear dampers 302 to a closed position in order to isolate the front and rear dampers and thereby mitigate forwards or rearwards roll of the vehicle 10 (e.g., during rapid acceleration of the vehicle 10 or during rapid braking of the vehicle 10).

Figure 10:
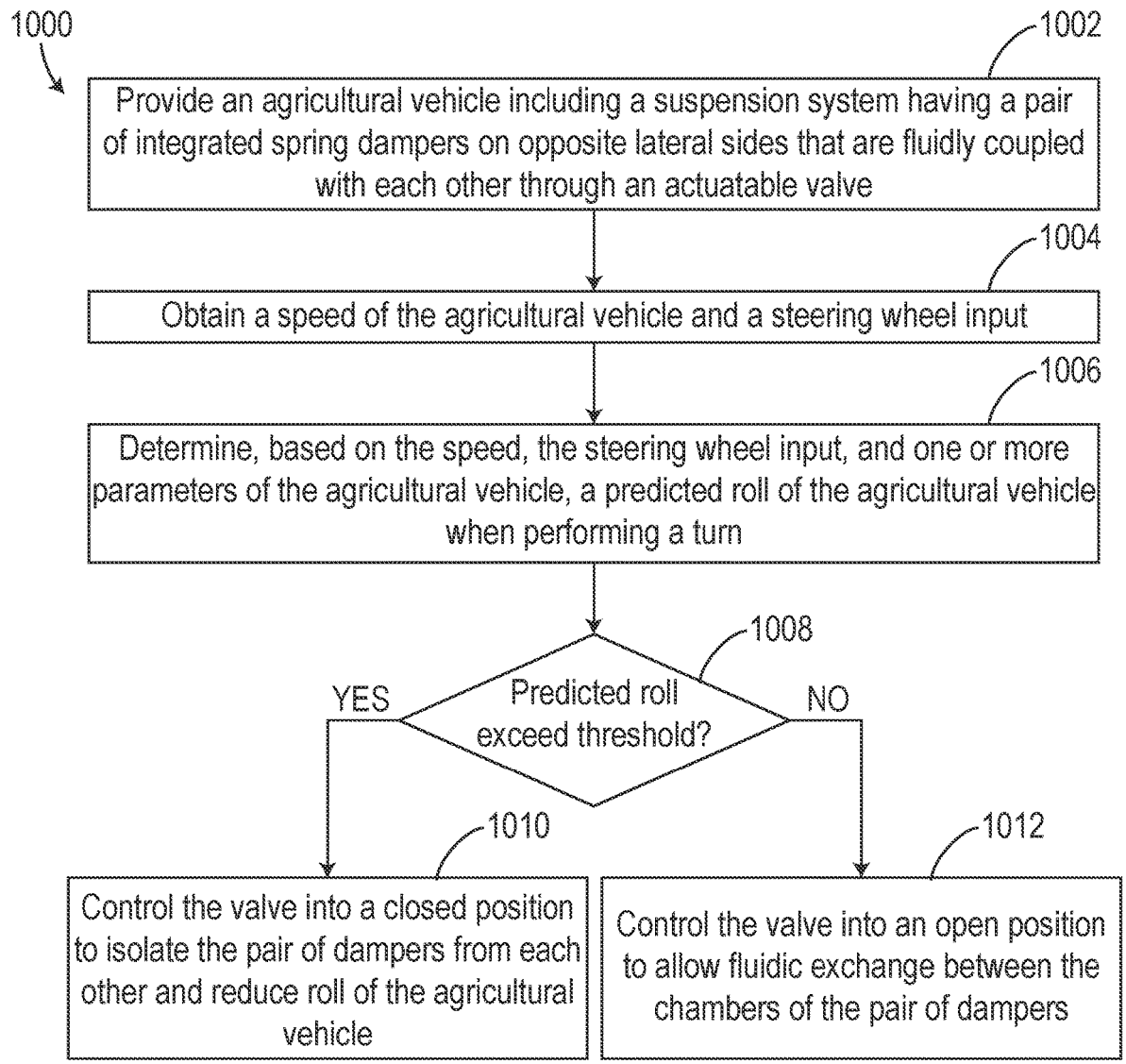
FIG. 10 is a flow diagram of a process for controlling a suspension system of an agricultural vehicle, according to an exemplary embodiment.

Referring to FIG. 10, a flow diagram of a process 1000 for controlling a suspension system of an agricultural vehicle includes steps 1002-1012, according to some embodiments. In some embodiments, the process 1000 can be performed in order to control the suspension system 300 of the vehicle 10 to mitigate roll of the vehicle 10 as predicted based on steering wheel operations.

The process 1000 includes providing an agricultural vehicle including a suspension system having a pair of integrated spring dampers on opposite lateral sides that are fluidly coupled with each other through an actuatable valve (step 1002), according to some embodiments. In some embodiments, the agricultural vehicle is the vehicle 10 as described in greater detail above with reference to FIGS. 1-9. The agricultural vehicle may include a pair of the dampers on opposite lateral sides at the front and rear end of a chassis of the agricultural vehicle. In some embodiments, the actuatable valve is transitionable between an open position in which the integrated spring dampers can exchange fluid with each other, and a closed position in which the integrated spring dampers are fluidly isolated from each other.

The process 1000 includes obtaining a speed of the agricultural vehicle and a steering wheel input (step 1004), according to some embodiments. In some embodiments, step 1004 includes obtaining feedback from a speed sensor or transmission of the agricultural vehicle, and obtaining a steering wheel input (e.g., a degree of turn of the steering wheel or a rate of change of the steering wheel) from a steering wheel sensor. Step 1004 may be performed by the controller 902 by obtaining the feedback from the speed sensor 912 and the steering wheel 910 or corresponding sensor of the steering wheel 910.

The process 1000 includes determining, based on the speed, the steering wheel input, and one or more parameters of the agricultural vehicle, a predicted roll of the agricultural vehicle when performing a turn (step 1006), according to some embodiments. In some embodiments, the turn that the roll is predicted for, is the turn indicated by the steering wheel input or adjustment to the steering wheel. The one or more parameters of the agricultural vehicle may include a weight, an estimated center of mass or gravity, a height of the center of mass or gravity relative to a ground surface, etc. In some embodiments, step 1006 is performed by conducting a dynamic analysis of the agricultural vehicle (e.g., including the impact of implements that are installed on the agricultural vehicle, the model of the vehicle, geometry or wheelbase of the agricultural vehicle, etc.) using the speed of the agricultural vehicle and the steering wheel input to predict the roll or an amount of tipping that will occur when performing the turn. In some embodiments, step 1006 is performed by the controller 902.

The process 1000 includes determining if the predicted roll exceeds a threshold (step 1008), according to some embodiments. In some embodiments, the predicted roll is compared to a threshold roll amount that the agricultural vehicle can experience. In some embodiments, the threshold roll amount is an amount of roll that, if greater than, the driver will experience undesirable forces during the turn. Responsive to the predicted roll exceeding the threshold (step 1008, "YES"), process 1000 proceeds to step 1010. Responsive to the predicted roll being less than the threshold (step 1008, "NO"), process 1000 proceeds to step 1012. In some embodiments, step 1008 is performed by the controller 902.

In some embodiments, steps 1006 and 1008 include determining if a turn is being performed by the agricultural vehicle while the agricultural vehicle is traveling at a threshold speed or greater. For example, if the agricultural vehicle is traveling at a speed of at least 50 kph or greater, and the driver operates the steering wheel to perform a turn, steps 1006 and 1008 may include determining that the predicted roll has exceeded the threshold, based on the speed of the agricultural vehicle, and process 1000 may proceed to step 1010 to close the valve.

The process 1000 includes controlling the valve into a closed position to isolate the pair of dampers from each other and reduce roll of the agricultural vehicle (step 1010), according to some embodiments. In some embodiments, step 1010 is performed by the controller 902 by providing control signals to the valve (e.g., a solenoid, a pneumatically actuated valve, an electrically operable valve, etc.). In some embodiments, step 1010 is performed to either maintain the valve in the closed position or to transition the valve into the closed position (e.g., valve 402). Closing the valve results in the integrated spring dampers being hydraulically isolated from each other, such that the integrated spring damper that is on the outside of the radius of the turn being performed by the agricultural vehicle is limited from compressing which could result in undesirable roll. In this way, the valve may control or mitigate body roll of the agricultural vehicle when performing a turn.

The process 1000 includes controlling the valve into the open position to allow fluidic exchange between the chambers of the pair of integrated spring dampers (step 1012), according to some embodiments. In some embodiments, step 1012 is performed by the controller 902 by providing control signal to the valve. In some embodiments, step 1012 is performed such that the dampers are free to compress to provide shock absorption when the agricultural vehicle travels over bumps, uneven terrain, etc., particularly during a field operation.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:

1. An agricultural vehicle comprising:
    a frame;
    a body assembly coupled with the frame;
    a suspension system comprising:
        a pair of integrated spring dampers positioned at opposite lateral ends of an axle, the pair of integrated spring dampers coupled between the body assembly and the axle;
        a hydraulic system comprising a hydraulic line fluidly coupling the pair of integrated spring dampers with each other through a valve, the valve actuatable between an open position in which the pair of integrated spring dampers are fluidly coupled with each other, and a closed position in which the pair of integrated spring dampers are hydraulically isolated from each other; and
    a control system comprising processing circuitry configured to:
        obtain sensor feedback indicating a steering operation of the agricultural vehicle; and
        responsive to the steering operation of the agricultural vehicle, operating the valve into the closed position to hydraulically isolate the pair of integrated spring dampers from each other to reduce a roll of the body assembly of the agricultural vehicle.

2. The agricultural vehicle of claim 1, wherein the valve is a pneumatically or electrically operable valve that is transitionable between the open position and the closed position.

3. The agricultural vehicle of claim 1, wherein:
    when the valve is in the open position, the pair of integrated spring dampers are fluidly coupled with each other such that fluid can flow out of a chamber of a first of the pair of integrated spring dampers when compressed, travel through the hydraulic line, and enter an accumulator or a chamber of a second of the pair of integrated spring dampers; and
    when the valve is in the closed position, the pair of integrated spring dampers are fluidly de-coupled from each other and hydraulically isolated such that fluid is limited from flowing out of the chamber of the first of the pair of integrated spring dampers to the chamber or the accumulator of the second of the pair of integrated spring dampers.

4. The agricultural vehicle of claim 1, wherein the pair of integrated spring dampers each include a single hydraulic chamber and are hydraulically single-acting suspension components.

5. The agricultural vehicle of claim 1, wherein the processing circuitry is configured to:
    obtain sensor feedback indicating a degree of rotation or a rate of rotation of a steering wheel and a speed of the agricultural vehicle;
    predict, based on the degree of rotation or the rate of rotation of the steering wheel, the speed of the agricultural vehicle, and one or more characteristics of the agricultural vehicle, a predicted amount of roll of the body assembly; and
    responsive to the predicted amount of roll of the body assembly exceeding a threshold roll amount, operating the valve to transition into the closed position to limit roll of the body assembly when performing the steering operation.

6. The agricultural vehicle of claim 5, wherein the one or more characteristics of the agricultural vehicle comprise a weight of the agricultural vehicle, a height of a center of gravity of the agricultural vehicle relative to a ground surface, and a type of implement installed on the agricultural vehicle.

7. The agricultural vehicle of claim 5, wherein the processing circuitry is further configured to:
    obtain ride height data from one or more ride height sensors while the agricultural vehicle performs a turn, the ride height data indicating a corner height of one of the pair of integrated spring dampers while performing the turn;
    control the valve to transition between the open position and the closed position according to a pulse width modulated signal, a duty cycle of the pulse width modulated signal determined based on the corner height of at least one of the pair of integrated spring dampers.

8. The agricultural vehicle of claim 1, wherein the processing circuitry is configured to, responsive to the steering operation, and a speed of the agricultural vehicle exceeding a threshold, operate the valve into the closed position.

9. A control system for an agricultural vehicle, the control system comprising processing circuitry configured to:
    obtain sensor feedback indicating a steering operation of the agricultural vehicle; and
    responsive to the steering operation of the agricultural vehicle, operating a valve of a suspension system into a closed position to hydraulically isolate a pair of integrated spring dampers from each other to reduce a roll of a body assembly of the agricultural vehicle;
    wherein the pair of integrated spring dampers are positioned at opposite lateral ends of an axle, the pair of integrated spring dampers coupled between the body assembly and the axle;

wherein the valve is positioned along a hydraulic line of a hydraulic system of the suspension system, the hydraulic line fluidly coupling the pair of integrated spring dampers with each other through the valve, the valve actuatable between an open position in which the pair of integrated spring dampers are fluidly coupled with each other, and the closed position in which the pair of integrated spring dampers are hydraulically isolated from each other.

10. The control system of claim 9, wherein the valve is a pneumatically or electrically operable valve that is transitionable between the open position and the closed position.

11. The control system of claim 9, wherein:
when the valve is in the open position, the pair of integrated spring dampers are fluidly coupled with each other such that fluid can flow out of a chamber of a first of the pair of integrated spring dampers when compressed, travel through the hydraulic line, and enter an accumulator or a chamber of a second of the pair of integrated spring dampers; and
when the valve is in the closed position, the pair of integrated spring dampers are fluidly de-coupled from each other and hydraulically isolated such that fluid is limited from flowing out of the chamber of the first of the pair of integrated spring dampers to the chamber or the accumulator of the second of the pair of integrated spring dampers.

12. The control system of claim 9, wherein the pair of integrated spring dampers each include a single hydraulic chamber and are hydraulically single-acting suspension components.

13. The control system of claim 9, wherein the processing circuitry is configured to:
obtain sensor feedback indicating a degree of rotation or a rate of rotation of a steering wheel and a speed of the agricultural vehicle;
predict, based on the degree of rotation or the rate of rotation of the steering wheel, the speed of the agricultural vehicle, and one or more characteristics of the agricultural vehicle, a predicted amount of roll of the body assembly; and
responsive to the predicted amount of roll of the body assembly exceeding a threshold roll amount, operating the valve to transition into the closed position to limit roll of the body assembly when performing the steering operation.

14. The control system of claim 13, wherein the one or more characteristics of the agricultural vehicle comprise a weight of the agricultural vehicle, a height of a center of gravity of the agricultural vehicle relative to a ground surface, and a type of implement installed on the agricultural vehicle.

15. The control system of claim 13, wherein the processing circuitry is further configured to:
obtain ride height data from one or more ride height sensors while the agricultural vehicle performs a turn, the ride height data indicating a corner height of one of the pair of integrated spring dampers while performing the turn;
control the valve to transition between the open position and the closed position according to a pulse width modulated signal, a duty cycle of the pulse width modulated signal determined based on the corner height of at least one of the pair of integrated spring dampers.

16. The control system of claim 9, wherein the processing circuitry is configured to, responsive to the steering operation, and a speed of the agricultural vehicle exceeding a threshold, operate the valve into the closed position.

17. A method for operating a suspension system of an agricultural vehicle, the method comprising:
obtaining sensor feedback indicating a steering operation of the agricultural vehicle; and
responsive to the steering operation of the agricultural vehicle, operating a valve of the suspension system into a closed position to hydraulically isolate a pair of integrated spring dampers from each other to reduce a roll of a body assembly of the agricultural vehicle;
wherein the pair of integrated spring dampers are positioned at opposite lateral ends of an axle, the pair of integrated spring dampers coupled between the body assembly and the axle; and
wherein the valve is positioned along a hydraulic line of a hydraulic system of the suspension system, the hydraulic line fluidly coupling the pair of integrated spring dampers with each other through the valve, the valve actuatable between an open position in which the pair of integrated spring dampers are fluidly coupled with each other, and the closed position in which the pair of integrated spring dampers are hydraulically isolated from each other.

18. The method of claim 17, wherein:
when the valve is in the open position, the pair of integrated spring dampers are fluidly coupled with each other such that fluid can flow out of a chamber of a first of the pair of integrated spring dampers when compressed, travel through the hydraulic line, and enter an accumulator or a chamber of a second of the pair of integrated spring dampers; and
when the valve is in the closed position, the pair of integrated spring dampers are fluidly de-coupled from each other and hydraulically isolated such that fluid is limited from flowing out of the chamber of the first of the pair of integrated spring dampers to the chamber or the accumulator of the second of the pair of integrated spring dampers.

19. The method of claim 17, comprising:
obtaining sensor feedback indicating a degree of rotation or a rate of rotation of a steering wheel and a speed of the agricultural vehicle;
predicting, based on the degree of rotation or the rate of rotation of the steering wheel, the speed of the agricultural vehicle, and one or more characteristics of the agricultural vehicle, a predicted amount of roll of the body assembly; and
responsive to the predicted amount of roll of the body assembly exceeding a threshold roll amount, operating the valve to transition into the closed position to limit roll of the body assembly when performing the steering operation;
wherein the one or more characteristics of the agricultural vehicle comprise a weight of the agricultural vehicle, a height of a center of gravity of the agricultural vehicle relative to a ground surface, and a type of implement installed on the agricultural vehicle.

20. The method of claim 17, further comprising:
obtaining ride height data from one or more ride height sensors while the agricultural vehicle performs a turn, the ride height data indicating a corner height of one of the pair of integrated spring dampers while performing the turn;
controlling the valve to transition between the open position and the closed position according to a pulse width modulated signal, a duty cycle of the pulse width modulated signal determined based on the corner height of at least one of the pair of integrated spring dampers.

* * * * *